US012784281B2

(12) United States Patent
Lasserre et al.

(10) Patent No.: US 12,784,281 B2
(45) Date of Patent: Nov. 3, 2026

(54) METHODS AND APPARATUS OF ENCODING/DECODING POSITIONS OF POINTS OF A POINT CLOUD ENCOMPASSED IN A CUBOID VOLUME

(71) Applicant: Beijing Xiaomi Mobile Software Co., Ltd., Beijing (CN)

(72) Inventors: Sebastien Lasserre, Beijing (CN); Jonathan Taquet, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 120 days.

(21) Appl. No.: 18/848,399

(22) PCT Filed: Feb. 21, 2023

(86) PCT No.: PCT/CN2023/077417
§ 371 (c)(1),
(2) Date: Sep. 18, 2024

(87) PCT Pub. No.: WO2023/179279
PCT Pub. Date: Sep. 28, 2023

(65) Prior Publication Data

US 2025/0200810 A1 Jun. 19, 2025

(30) Foreign Application Priority Data

Mar. 25, 2022 (EP) .................................... 22305367

(51) Int. Cl.
*G06T 9/00* (2006.01)
*G06T 17/00* (2006.01)

(52) U.S. Cl.
CPC ................ *G06T 9/00* (2013.01); *G06T 17/00* (2013.01); *G06T 2210/56* (2013.01)

(58) Field of Classification Search
CPC ............................ G06T 17/00; G06T 2210/56
(Continued)

(56) References Cited

U.S. PATENT DOCUMENTS

2022/0122296 A1* 4/2022 Zhang .................... G06T 17/00
2023/0388557 A1* 11/2023 Oh ......................... H04N 19/96

FOREIGN PATENT DOCUMENTS

GB 2551387 B 12/2019

OTHER PUBLICATIONS

ISA State Intellectual Property Office of the People's Republic of China, Written Opinion and Search Report of the International Searching Authority Issued in Application No. PCT/CN2023/077417, Apr. 24, 2023, WIPO, 8 pages.

(Continued)

*Primary Examiner* — Samantha (Yuehan) Wang
(74) *Attorney, Agent, or Firm* — Finnegan, Henderson, Farabow, Garrett & Dunner, L.L.P.

(57) ABSTRACT

A method of encoding, into a bitstream, positions of points of a point cloud encompassed in a cuboid volume is provided, the positions being represented in a three-dimensional coordinate system, at least three vertices being located on edges of the cuboid volume. The method includes: obtaining quantized positions of the at least three vertices by quantizing the positions of the at least three vertices based on a vertex quantization step that depends on at least one quantization parameter; encoding, into the bitstream, vertex information defining the quantized positions of the at least three vertices; and encoding the at least one quantization parameter into the bitstream.

15 Claims, 8 Drawing Sheets

(58) Field of Classification Search
USPC .......................................................... 345/419
See application file for complete search history.

(56) References Cited

OTHER PUBLICATIONS

Extended European Search Report Issued in Application No. 22305367.9 dated Sep. 16, 2022, 10 pages.
Mammou, K., et al., "PCC Test Model Category 13 v2", 3DG, International Organisation for Standardisation Organisation, ISO/IEC,JTC1/SC29/WG11, Apr. 2018, 13 pages.
Nakagami, O, et al., "Third Working Draft for G-PCC (Geometry-based PCC)", 3DG Subgroup, International Organization for Standardization Organisation, ISO/IEC,JTC1/SC29/WG 11, Jul. 2018, 46 pages.

* cited by examiner

METHODS AND APPARATUS OF ENCODING/DECODING POSITIONS OF POINTS OF A POINT CLOUD ENCOMPASSED IN A CUBOID VOLUME

CROSS-REFERENCE TO RELATED APPLICATION

This application is the U.S. National Stage Application of International Application No. PCT/CN2023/077417, filed on Feb. 21, 2023, which claims priority to and benefits of European Patent Application No. 22305367.9, filed Mar. 25, 2022, the entire content of which is incorporated herein by reference.

FIELD

The present disclosure generally relates to point cloud compression and, in particular to methods and apparatus of encoding/decoding positions of points of a point cloud encompassed in a cuboid volume.

BACKGROUND

The present section is intended to introduce the reader to various aspects of art, which may be related to various aspects of at least one embodiments of the present disclosure that is described and/or claimed below. This discussion is believed to be helpful in providing the reader with background information to facilitate a better understanding of the various aspects of the present disclosure.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allow for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard W that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a three-dimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of geometry data (locations of the points in a 3D space usually represented by 3D cartesian coordinates x, y and z) and attributes.

Point clouds may be sensed by various types of devices like an array of cameras, depth sensors, lasers (light detection and ranging, also known as Lidars), radars, or may be computer-generated (for example in movie post-production). Depending on the use cases, point clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, has initiated work items on point cloud compression. This has led to two standards, namely

- MPEG-I part 5 (ISO/IEC 23090-5) or Video-based Point Cloud Compression (aka V-PCC)
- MPEG-I part 9 (ISO/IEC 23090-9) or Geometry-based Point Cloud Compression (aka G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-sensed sparse geometry data.

The G-PCC coding method has two schemes for the compression of a sensed sparse geometry data.

The first scheme is based on an occupancy tree, being locally any type of tree among octree, quadtree or binary tree, representing the point cloud geometry. Occupied nodes (i.e. a node associated with a cuboid volume comprising at least one point of the point cloud) are split down until a certain size is reached, and occupied leaf nodes provide the 3D locations of points, for example at the center of these nodes. The occupancy information is carried by occupancy data (binary data, flag) signaling the occupancy status of each of the child nodes of nodes. By using neighbor-based prediction techniques, high level of compression of the occupancy data can be obtained for dense point clouds.

Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass (de)coding. Thus, the joint geometry/attribute low latency is obtained by using slices that decompose the 3D space into sub-volumes that are coded independently, without prediction between the sub-volumes. This may heavily impact the compression performance when many slices are used.

An important use case is the transmission of dynamic AR/VR point clouds. Dynamic means that the point cloud evolves with respect to time. Also, AR/VR point clouds are typically locally 2D as they most of time represent the surface of an object. As such, AR/VR point clouds are highly connected (or said to be dense) in the sense that a point is rarely isolated and, instead, has many neighbours.

Dense (or solid) point clouds represent continuous surfaces with a resolution such that cuboid volumes (small cubes) associated with points touch each other without exhibiting any visual hole in the surface.

Such point clouds are typically used in AR/VR environments and are viewed by the end user through a device like a TV, a smartphone or a headset. They are transmitted to the device or usually stored locally. Many AR/VR applications use moving point clouds, as opposed to static point clouds, that vary with time. Therefore, point cloud data is huge and must be compressed.

Nowadays, lossless compression based on an octree representation of the geometry of a point cloud frame (temporal instance of a point cloud) can achieve down to slightly less than a bit per point (1 bpp). This may not be sufficient for real time transmission that may involve several millions of points per point cloud frame with a frame rate as high as 50 frames per second (fps), thus leading to hundreds of megabits of data per second.

Consequently, lossy compression may be used with the usual requirement of maintaining an acceptable visual quality while compressing sufficiently to fit within the bandwidth provided by the transmission channel. In most of applications, real time transmission of the point cloud frames must be ensured, thus imposing complexity and latency constrains on the compression scheme. In many applications, bitrates as low as 0.1 bpp (10× more compressed than lossless coding) would already make possible real time transmission.

V-PCC can achieve such low bitrates by using lossy compression of video codecs that compress 2D frames (pictures) obtained from the projection of parts of the point cloud on a set of planes to obtain projection patches. The geometry of a point cloud frame is represented by these projection patches assembled into a frame, each patch being a small local depth map. However, V-PCC is not versatile and is limited to a narrow type of point clouds that do not exhibit locally complex geometry (like trees, hair) because the obtained projected depth map would not be smooth enough to be efficiently compressed by a video codec like HEVC or VVC.

Purely 3D compression techniques can handle any type of point clouds. It is still an open question whether 3D compression techniques can compete with V-PCC (or any projection+image coding scheme) on dense point clouds. Standardization is still under its way toward offering an extension (an amendment) of the current G-PCC codec to provide competitive lossy compression that would compress dense point clouds as good as V-PCC intra while maintaining the versatility of G-PCC that can handle any type of point clouds (dense, sparse such as Lidar based captured point clouds, 3D maps, etc.).

There are basically three main approaches to obtain a lossy scheme over the octree representation of a point cloud as done by the current G-PCC codec.

A first approach consists in down-sampling the whole point cloud to a smaller resolution, lossless encoding the down-sampled point cloud, decoding the encoded down-sampled point cloud, and then up-sampling the decoded down-sampled point cloud to its original resolution. Many up-sampling schemes have been proposed (like super resolution, artificial intelligence based up-sampling, learning-based 3D post-processing, etc.). The first approach may provide good PSNR (Peak Signal to Noise Ratio) results when the down-sampling is not too aggressive, say no more than a factor 2 in each spatial direction. However, even if this first approach may provide good PSNR results, the visual quality of the up-sampled point cloud is disputable and not well controlled.

A second approach is to let the encoder "adjust" the point cloud locally such that the coding of the octree requires less bitrate. For this purpose, points of the point cloud may be slightly moved such as to obtain occupancy information better predicted by neighboring nodes, thus leading to a lossless encoding of a modified octree with a lowered bitrate. Unfortunately, this approach leads to only small bitrate reduction.

A third approach is based on the so-called TriSoup coding scheme that is under exploration in the standardization working group JTC1/SC29/WG7 of ISO/IEC. The TriSoup coding scheme is the most promising of the three approaches but still requires some work before reaching maturity.

The TriSoup coding scheme provides a local model of the geometry of a point cloud by using a set of triangles without explicitly providing connectivity information, thus its name derived from "soup of triangles".

The point cloud geometry is represented in a three-dimensional coordinate system by a 3D tree (usually an octree) down to some resolution, say down N×N×N cuboid volumes (cubes) associated with leaf nodes where N may be 4, 8 or 16 for example. This tree is coded using a lossless coding scheme, like G-PCC for example. The tree itself does not require much bitrate because it does not go down to the deepest depth and has a small number of leaf nodes (cuboid volumes) compared to the number of points of the point cloud. Then, in each N×N×N cuboid volume, the point cloud geometry is modelled by some local model made of a set of triangles. Vertices of triangles are coded along edges of cuboid volumes associated with leaf nodes of the tree, as shown on FIG. 1. Four vertices (dark black points) along edges of a cube are shown. These four vertices are used to form two triangles as discussed later.

The TriSoup coding scheme is not limited to a particular number of vertices located along edges of a cuboid volume but imposes at most one vertex per edge. The TriSoup coding scheme is not limited to a particular number of triangles in a particular cuboid volume. A Vertex is shared among cuboid volumes having in common the edge to which the vertex belongs. This means that at most one vertex is coded per edge belonging to at least one cuboid volume. By doing so, continuity of the local model is ensured through cuboid volumes associated with the leaf nodes of the tree.

Coding of vertices located on edges of a cuboid volume requires encoding of vertex information per vertex that comprises a vertex flag indicating if a vertex is present on an edge of the cuboid volume and, if present, the vertex position along the edge. A position of the vertex in the three-dimensional coordinate system is then obviously deduced from said vertex position along the edge and the position of the starting and ending vertices of the cuboid volume that define said edge.

The vertex flag may be coded by an adaptive binary arithmetic coder that uses one specific context for coding vertex flags. The vertex position along an edge of length $N=2^s$ may be coded with unitary precision by pushing (bypassing/not entropy coding) s bits into the bitstream.

In summary, coding a point cloud geometry using the TriSoup coding scheme requires coding of octree data (by G-PCC for example) and coding of vertex information. The increase of encoded data due to the encoding of vertex information is more than compensated by the improvement of the reconstruction of the point cloud by triangles as discussed hereafter.

Inside a cuboid volume associated with a leaf node of the tree, at least one triangle is constructed from the vertices if at least three vertices are present on the edges of the cuboid volume. When more than three vertices are present on edges of a cuboid volume, more than one triangle may be constructed.

Multiple construction processes exist to construct such triangles.

In the current TriSoup coding scheme, a triangle is constructed by first determining a dominant direction along one of the three axes of the three-dimensional coordinate system in which the cuboid volume is represented; next, at least three vertices are ordered based on the determined dominant direction; and, finally, at least one triangle is constructed based on a list of at least three ordered vertices.

The dominant direction is determined by testing each of the three directions along the three axes and the one maximizing the total surfaces (seen along the tested direction) of triangles is kept as dominant direction.

FIGS. 2 and 3 show and illustrative example of a process to determine a dominant direction in accordance with the current TriSoup.

For simplicity of the figures, only the tests over two axis are depicted on FIGS. 2 and 3.

FIG. 2 shows an illustrative example when the cuboid volume and four vertices (bottom-right) are projected along the vertical axis on a 2D plane (top-right). The four vertices are then ordered following a clockwise order relative to the center of the projected cuboid volume (a square). Then, two triangles are constructed following a fixed rule based on the ordered vertices (top-left). Here, the fixed rule is to construct triangles 123 and 134 when 4 vertices are involved. When 3 vertices are present, the only possible triangle 123 may be constructed. When 5 vertices are present, triangles 123, 134 and 451 may be constructed. And so on, up to 12 vertices. Other fixed rule for constructing triangles from vertices may be used.

FIG. 3 shows an illustrative example when the cuboid volume and four vertices (bottom-right) are projected along the horizontal axis on a 2D plane (bottom-left). The four vertices are then ordered following a clockwise order relative to the center of the projected cuboid volume (a square). Then, two triangles are constructed following the above fixed rule based on the ordered vertices (top-left).

In the examples of FIGS. 2 and 3, the vertical projection (FIG. 2) exhibits a 2D total projected surface of triangles on the 2D plane that is maximum (greater than the 2D total projected surface of triangles on the 2D plane resulting from the horizontal projection, FIG. 3). Thus, the dominant direction is selected as vertical, and the two triangles are constructed from the vertices ordered according to the numbering of those vertices resulting of the vertical projection.

The selection of the dominant direction by maximizing the 2D total projected surface of triangles on the 2D plane leads to a continuous reconstruction of the point cloud without holes.

In the current TriSoup coding scheme, a ray tracing process is performed on each cuboid volume of the tree to render the triangles defined inside each cuboid volume into rendered points representing (modeling) points of the point cloud encompassed in said cuboid volume. The positions of all rendered points by ray tracing will make positions of decoded points of the point cloud. This process is called "voxelization" of the triangles.

Basically, ray racing performed on a triangle of a cuboid volume consists in launching rays along the three directions parallel to axes of the three-dimensional coordinate system as shown on FIG. 4. Origins of the launched rays are points of integer (voxelized) coordinates of precision corresponding to a sampling precision wanted for the rendering. The intersection (if any, dashed point) of a ray with a triangle is then voxelized (=rounded to the closest point at the wanted sampling precision) and added to the list of rendered points.

After applying the TriSoup coding scheme to the cuboid volumes associated with all the leaf nodes of a tree representing a point cloud geometry, i.e. constructing triangles for each of the cuboid volume and obtaining rendered points by ray tracing, copies of same rendered points in the list of all rendered points are discarded (i.e. only one voxel (rendered point) is kept among all voxels sharing a same three-dimensional position) to obtain a set of decoded (unique) points of the point cloud.

The construction of triangles following a fixed rule based on the ordered vertices may lead to visually awkward results when more than 4 vertices are involved. Actually, other triangles may be constructed for a given set of vertices which are different from the triangles constructed by the above fixed rule leading to different sets of rendered points (different visual aspects of the decoded points of the point cloud). Also, it turns out that reconstructing triangles based on the above fixed rule is not optimal in terms of PSNR (Peak Signal to Noise Ratio) results.

The problem is to improve the current TriSoup coding scheme to provide better and more stable visual aspect of a decoded point cloud and to improve the objective metrics (PSNR).

At least one embodiment of the present disclosure has been devised with the foregoing in mind.

SUMMARY

According to a first aspect of the present disclosure, there is provided a method of encoding, into a bitstream, positions of points of a point cloud encompassed in a cuboid volume, said positions being represented in a three-dimensional coordinate system, at least three vertices being located on edges of the cuboid volume. The method comprises obtaining quantized positions of the at least three vertices by quantizing the positions of the at least three vertices based on a vertex quantization step that depends on at least one quantization parameter; encoding, into the bitstream, vertex information defining the quantized positions of the at least three vertices; and encoding the at least one quantization parameter into the bitstream According to a second aspect of the present disclosure, there is provided a method of decoding, from a bitstream, positions of points of a point cloud encompassed in a cuboid volume, said positions being represented in a three-dimensional coordinate system. The method comprises decoding, from the bitstream, vertex information defining at least three vertices located on edges of the cuboid volume, a single vertex per edge; decoding at least one quantization parameter from the bitstream; obtaining de-quantized positions of at least three vertices by de-quantizing positions of the at least three vertices based on a vertex quantization step that depends on the at least one quantization parameter; and constructing at least one triangle from the de-quantized positions of the at least three vertices; positions of rendered points obtained by voxelization of the at least one triangle representing the positions of the points of the point cloud encompassed in the cuboid volume.

According to a third aspect of the present disclosure, there is provided a non-transitory storage medium carrying instructions of program code for executing a method according to the first aspect of the present disclosure.

BRIEF DESCRIPTION OF THE DRAWINGS

Reference will now be made, by way of example, to the accompanying drawings which show embodiments of the present disclosure, and in which.

Similar reference numerals may have been used in different figures to denote similar components.

DETAILED DESCRIPTION

Example embodiments are described below with reference to the accompanying figures. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the scope of the present disclosure.

At least one of the aspects generally relates to point cloud encoding and decoding, one other aspect generally relates to transmitting a bitstream generated or encoded and one other aspects relates to receiving/accessing a decoded bitstream.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present disclosure may be used individually or in combination.

As usual in lossy compression, a balance must be found between the bitrate used for coding vertex information and quality (PSNR, visual quality) of the decoded point cloud such that the overall bitrate vs distortion trade-off is optimized.

In brief, the present invention relates to the TriSoup coding scheme. It provides quantizing the positions of vertices based on at least one quantization parameter and encoding said at least one quantization parameter into the bitstream. The vertex quantization parameter is decoded and positions of the TriSoup vertices are de-quantized (inverse quantized) based on the at least one decoded quantization parameter.

Quantizing positions of the vertices improves the overall bitrate vs distortion trade-off for coding positions of point cloud encompassed in the cuboid volume.

Figure 1:
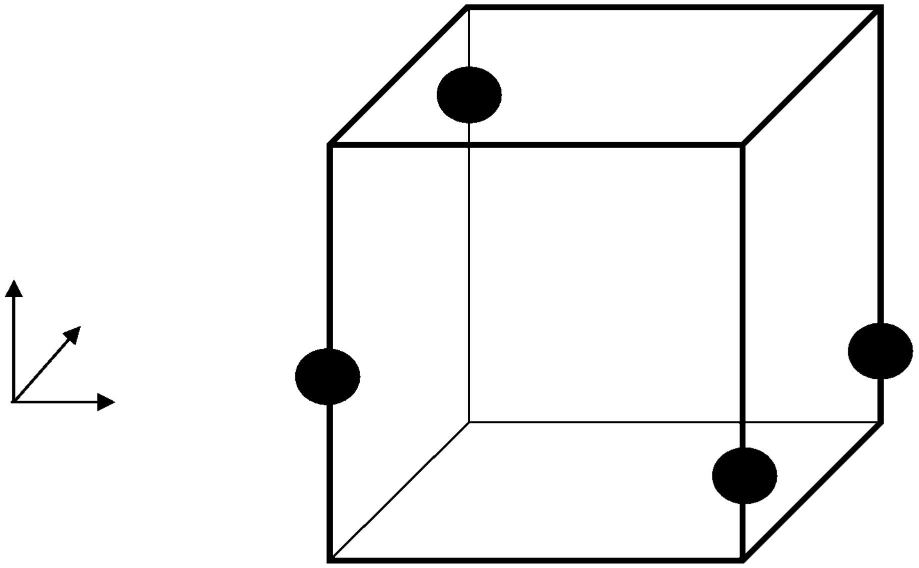
FIG. 1 shows schematically a TriSoup cuboid volume comprising four vertices.
Figure 2:
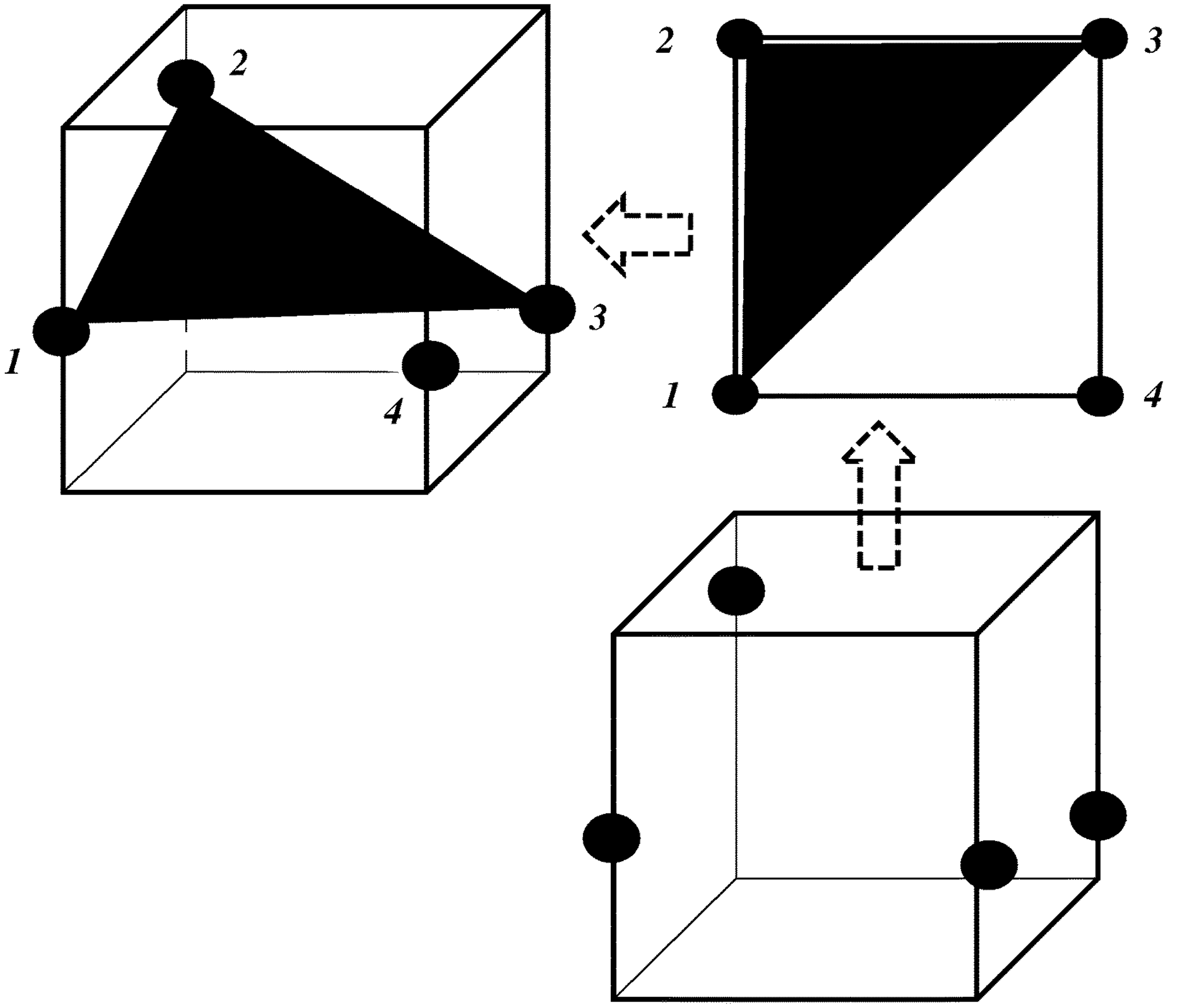
FIG. 2 shows an illustrative example of a process to determine a dominant direction in accordance with the current TriSoup.
Figure 3:
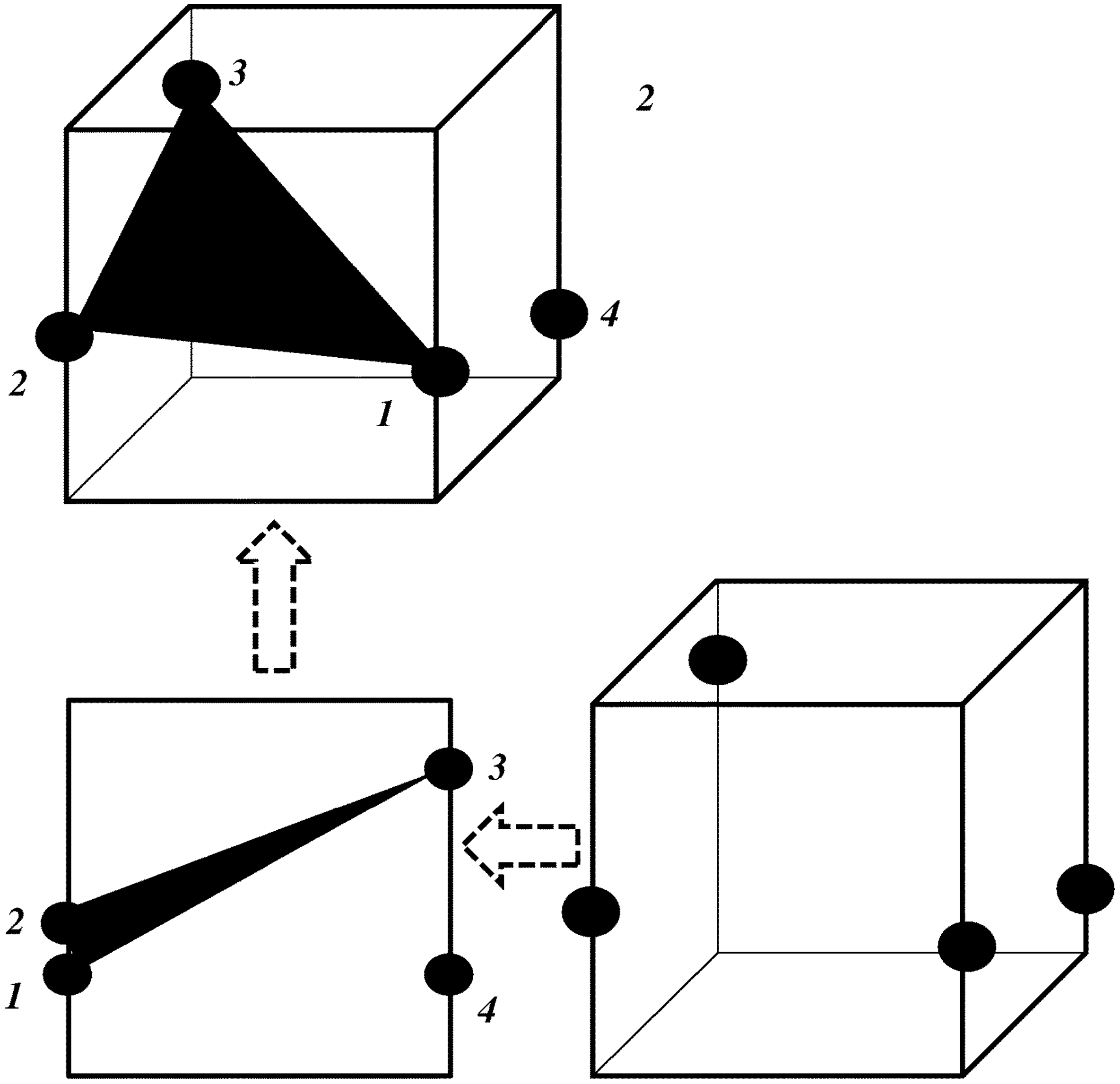
FIG. 3 shows an illustrative an example of a process to determine a dominant direction in accordance with the current TriSoup.
Figure 4:
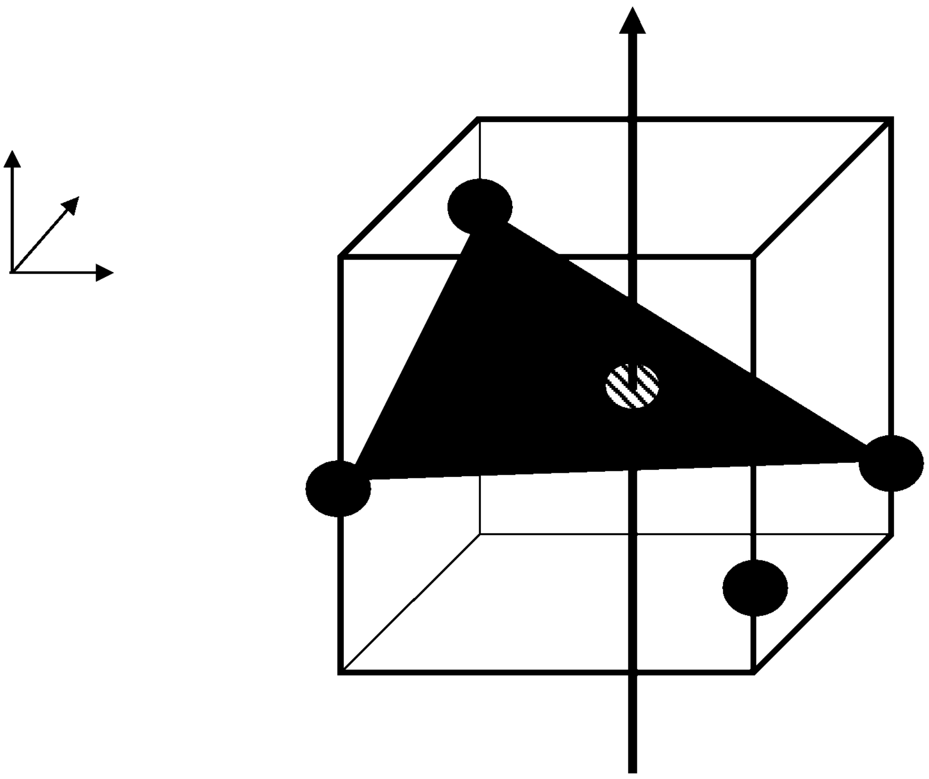
FIG. 4 shows schematically an example of ray tracing for rendering a point of the point cloud in accordance with one embodiment.
Figure 5:
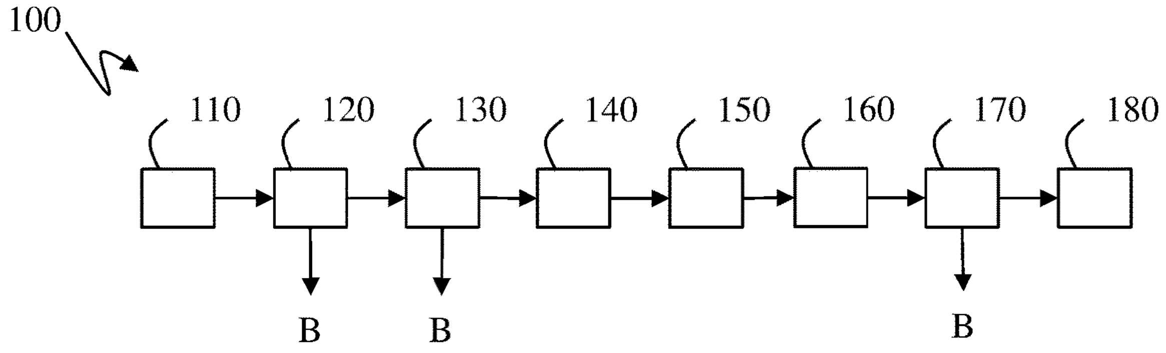
FIG. 5 shows a schematic block diagram of a method 100 of encoding, into a bitstream, positions of points of a point cloud encompassed in a cuboid volume, in accordance with at least one embodiment.

FIG. 5 shows a schematic block diagram of a method 100 of encoding, into a bitstream B, positions of points of a point cloud encompassed in a cuboid volume, in accordance with at least one embodiment.

FIG. 5 describes the encoding of positions of points of a point cloud encompassed in a cuboid volume. Obviously, this method may apply to all the cuboid volumes that represent a whole point cloud geometry.

The positions of the points of the point cloud encompassed in the cuboid volume and positions of vertices are represented in a three-dimensional coordinate system. At least three vertices are located along edges of the cuboid volume.

In step 110, quantized positions $p_Q$ of the at least three vertices are obtained by quantizing the positions p of the at least three vertices $V_i$ (i=1, . . . , M) based on a vertex quantization step ΔV that depends on at least one quantization parameter:

$$p_Q = \text{round}(p/\Delta V)$$

In the current TriSoup coding scheme, quantization of the vertex positions is not performed because, for N×N×N cuboid volumes (nodes) ($N=2^s$), the vertex positions are coded with maximum possible precision using s bits such that the position precision is as low as unity.

In step 120, vertex information defining the quantized positions of the at least three vertices is encoded into the bitstream B.

The vertex information for a vertex comprises a vertex flag indicating if the vertex is present on an edge of the cuboid volume and, if present, the quantized vertex position along the edge.

In step 130, the at least one quantization parameter is encoded into the bitstream B.

In one embodiment, encoding method 100 may further comprise steps 140-180.

In step 140, de-quantized positions $p_{dec}$ of the at least three vertices are obtained by de-quantizing quantized positions $p_Q$ of the at least three vertices (step 110) based on the vertex quantization step ΔV that depends on the at least one quantization parameter.

The de-quantized positions $p_{dec}$ are obtained by:

$$p_{dec} = p_Q * \Delta V$$

In step 150, a point C is determined in the cuboid volume by adding a centroid point $C_{mean}$ defined from a mean value of the de-quantized positions $p_{dec}$ of the at least three vertices and a one-dimensional residual position $C_{res}$ defined as a product of a normal vector $\vec{n}$ by a residual value α:

$$C_{res} = \alpha * \vec{n}$$

Figure 7:
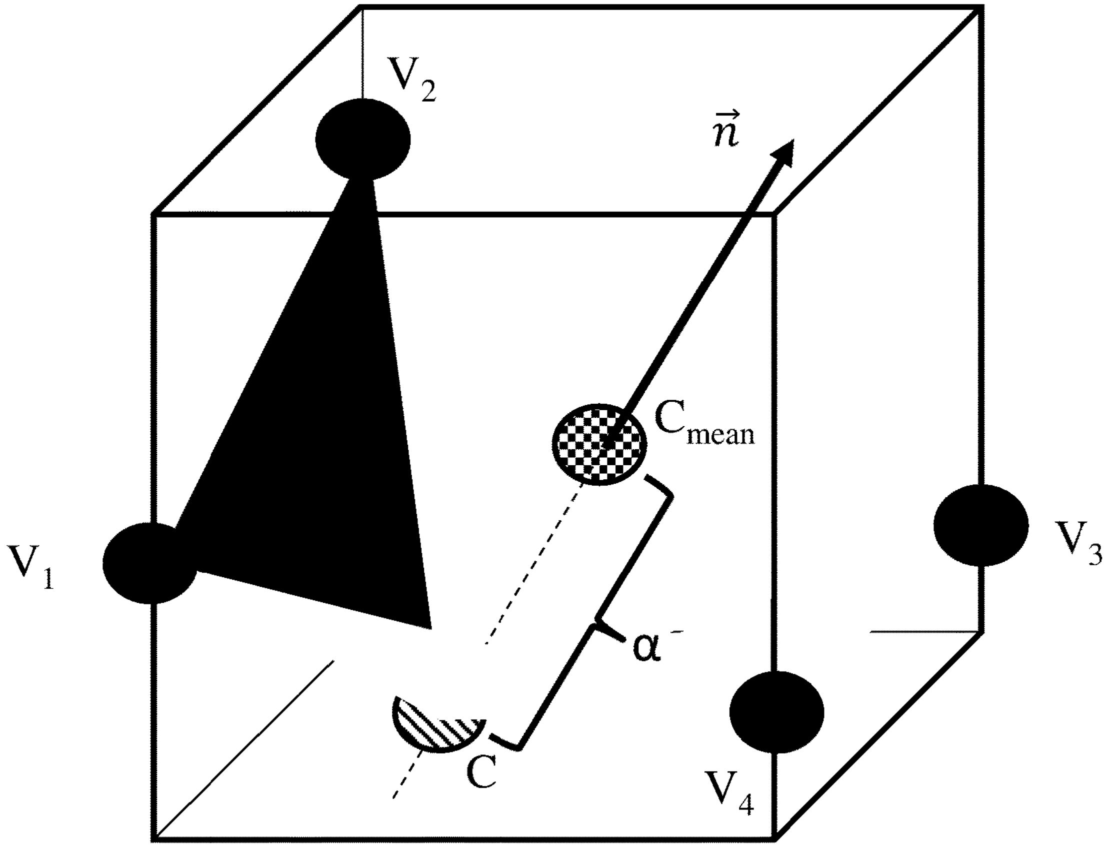
FIG. 7 shows an example of a residual value along a line defined from the centroid point and a normal vector.

The centroid point $C_{mean}$ is defined from a mean value of the de-quantized positions $p_{dec}$ of the at least three vertices (FIG. 7). More precisely, the coordinates of the centroid point $C_{mean}$ in the three-dimensional coordinate system is equal to a mean value of coordinates of the de-quantized positions $p_{dec}$ of the at least three vertices.

The residual value α is a signed scalar value as illustrated on FIG. 7.

In one embodiment of step 150, the normal vector $\vec{n}$ may be defined by calculating a vector $\vec{m}$ as a sum of cross products (also named vector or cross product $\vec{E_m} \times \vec{E_n}$ between two vectors $\vec{E_m}$ and $\vec{E_n}$) as follows $$\vec{m} = \vec{E_1} \times \vec{E_2} + \ldots + \overrightarrow{E_{M-1}} \times \vec{E_M} + \vec{E_M} + \vec{E_1}$$

where each vector $\vec{E_j}$ is defined by:

$$\vec{E_J} = \overrightarrow{V_J C_{mean}}$$

and by normalizing the vector $\vec{m}$:

$$\vec{n} = \vec{m}/\sqrt{\|\vec{m}\|}$$

In one embodiment of step 150, the normal vector $\vec{n}$ may be taken parallel to an axis of the three-dimension coordinate system in order to simplify computation of its determination and the residual value α.

In one embodiment of step 150, the normal vector $\vec{n}$ may be taken parallel to the dominant direction defined above.

Such a normal vector is a good approximation of the normal vector computed above.

The residual value α and thus the residual position $C_{res}$ is determined such that the adjusted position of the point C is closer from original points of the point cloud encompassed I the cuboid volume.

In one embodiment of step 150, the residual value α may be determined by considering all points $P_k$ of the point cloud belonging to the cuboid volume. For each point $P_k$, its distance $d_k$ from the line ($C_{mean}$, $\vec{n}$) is found by:

$$d_k = \left\|\vec{n} \times \overrightarrow{C_{mean}P_k}\right\|,$$

and in case this distance $d_k$ is below some threshold th (say th=2), the points $P_k$ is used to compute the value α. A 1D residual $r_k$ of a point $P_k$ relative to the centroid point $C_{mean}$ is obtained by the scalar product (also named inner product or dot product)

$$r_k = \vec{n} \cdot \overrightarrow{C_{mean}P_k}$$

The residual value α is thus obtained b $$\alpha = \sum\nolimits_{P_k \in S} r_k/|S|$$

where S is the set of points $P_k$ such that their distance $d_k$ is below the threshold th, and |S| is the number of points belonging to this set.

In step 160, a quantized residual value $\alpha_Q$ is obtained by quantizing the residual value α based on a residual quantization step ΔC that depends on the at least one quantization parameter.

In one embodiment of step 160, the quantized residual value $\alpha_Q$ is obtained by:

$$\alpha_Q = \text{round}(\alpha/\Delta C).$$

Quantizing the residual value α improves the overall bitrate vs distortion trade-off for coding positions of point cloud encompassed in the cuboid volume.

In step 170, the quantized residual value ($\alpha_Q$) is encoded into the bitstream B.

In one embodiment of step 170, the quantized residual value $\alpha_Q$ may be binarized and each bit may be encoded by using a binary entropy coder such as an arithmetic coder or a context adaptive binary coder like CABAC.

In variant, the residual value $\alpha_Q$ may be binarized into a flag $f_0$ indicating if $\alpha_Q$ is equal to 0, a sign that indicates if $\alpha_Q>0$ or $\alpha_Q<0$, a flag $f_1$ indicating if $|\alpha_Q|$ is equal to 1, and a remainder $|\alpha_Q|-2$ coded by an expGolomb coder.

In a variant of method 100, in step 180, at least one triangle may be constructed from the de-quantized positions $p_{dec}$ of the at least three vertices and a decoded determined point $C_{dec}$ determined by $$C_{dec} = C_{mean} + IQ(\alpha_Q)^*\vec{n}$$

where $IQ(\alpha_Q)$ is the de-quantized value of $\alpha_Q$.

In one embodiment, $IQ(\alpha_Q)$ may be obtained as $$IQ(\alpha_Q) = \alpha_Q * \Delta C$$

In one embodiment of step 180, a dominant direction may be determined along one of the three axes of the three-dimensional coordinate system as discussed above. The at least three vertices may be ordered based on said dominant direction and the at least one triangle may be constructed based of the de-quantized positions $p_{dec}$ of the at least three ordered vertices and the decoded determined point $C_{dec}$.

Constructing triangles in method 100 leads to positions of rendered points obtained by voxelization of the constructed triangles. Ray tracing applies on the constructed triangles may be used. Those positions represent positions of points of the point cloud encompassed in the cuboid volume. Those positions may be used, for example, for encoding attributes of points of the point cloud encompassed in the cuboid volume.

Figure 6:
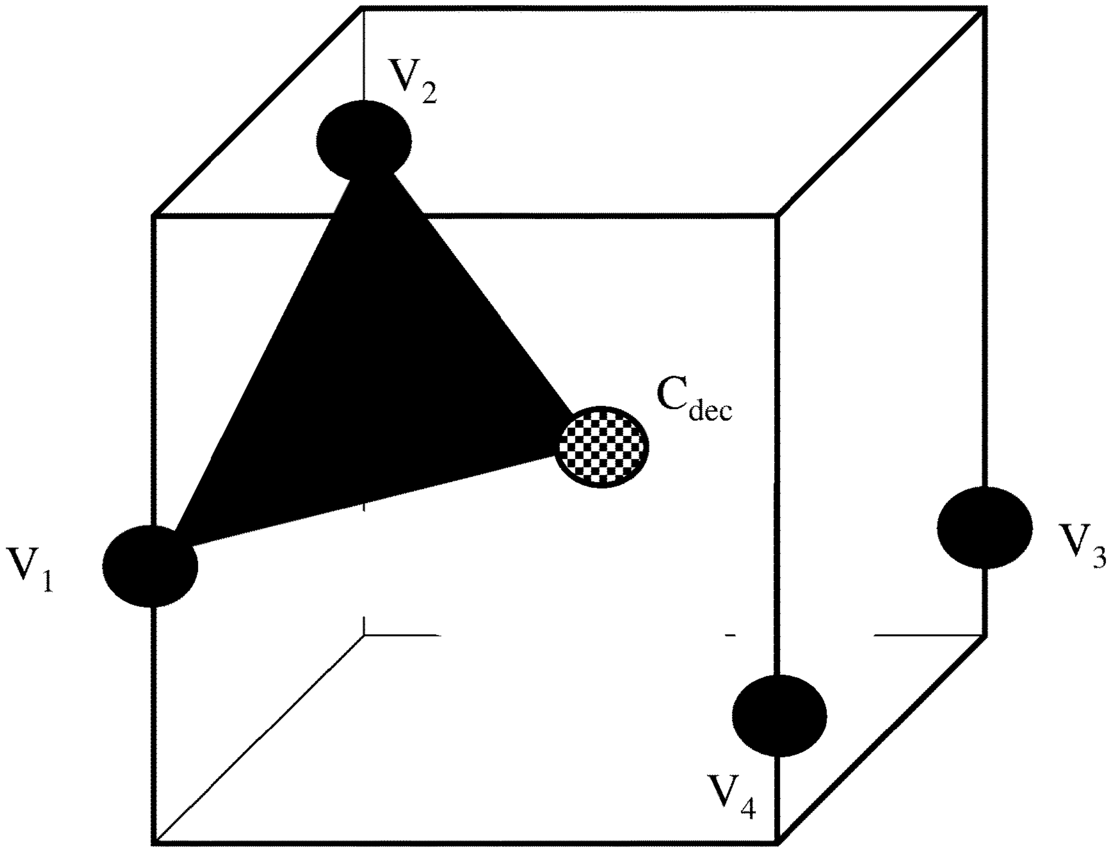
FIG. 6 shows schematically an example of triangles constructed from four vertices and a determined decoded point of the cuboid volume in accordance with one embodiment.

FIG. 6 shows schematically an example of triangles construction from de-quantized positions $p_{dec}$ of four ordered vertices $V_i$ (i=1, . . . , 4) and the decoded determined point $C_{dec}$ Four triangles are constructed in this shown example from the ordered vertices $V_i$ (i=1, . . . , 4) by pivoting around the decoded determined point $C_{dec}$. The four constructed triangles are ($V_1V_2C_{dec}$), ($V_2V_3C_{dec}$), ($V_3V_4C_{dec}$), and ($V_4V_1C_{dec}$). More generally, M constructed triangles are constructed from M ordered vertices $V_i$ (i=1, . . . , M).

Figure 8:
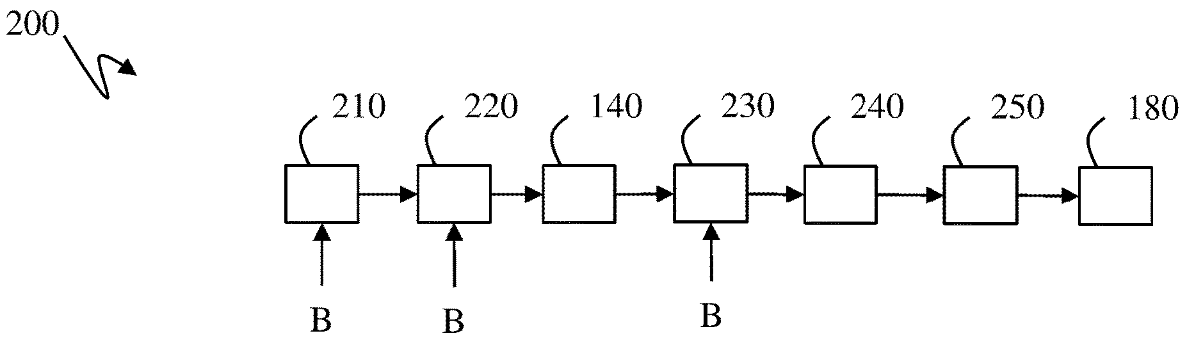
FIG. 8 shows a schematic block diagram of a method 200 of decoding, from the bitstream B, positions of points of a point cloud encompassed in a cuboid volume, in accordance with at least one embodiment.

FIG. 8 shows a schematic block diagram of a method 200 of decoding, from the bitstream B, positions of points of a point cloud encompassed in a cuboid volume, in accordance with at least one embodiment.

In step 210, vertex information is decoded from the bitstream B. The vertex information defines at least three vertices located on edges of the cuboid volume.

In step 220, at least one quantization parameter is decoded from the bitstream B.

In step 140, as discussed above, de-quantized positions $p_{dec}$ of at least three vertices are obtained by de-quantizing positions $p_Q$ of the at least three vertices (obtained in step 210) based on a vertex quantization step $\Delta V$ that depends on the at least one quantization parameter (obtained in step 220).

In step 180, as discussed above, at least one triangle is constructed from the de-quantized positions $p_{dec}$ of the at least three de-quantized vertices.

The positions of rendered points obtained by voxelization of for example ray tracing applied on) the at least one triangle represent the positions of the points of the point cloud encompassed in the cuboid volume.

In accordance with embodiments and variants of method 100, method 200 further comprises steps 230-250.

In step 230, a quantized residual value $\alpha_Q$ is decoded from the bitstream B.

In step 240, a de-quantized (decoded) residual value $IQ(\alpha_Q)$ is obtained by de-quantizing the quantized residual value $\alpha_Q$ based on a residual quantization step $\Delta C$ that depends on the at least one quantization parameter $$IQ(\alpha_Q) = \alpha_Q * \Delta C$$

In step 250, a decoded determined point $C_{dec}$ is determined in the cuboid volume by adding a centroid point $C_{mean}$ defined from a mean value of the de-quantized positions $p_{dec}$ of at least three vertices and a one-dimensional de-quantized residual position defined as a product of a normal vector $\vec{n}$ by the de-quantized residual value $IQ(\alpha_Q)$.

In step 180, as discussed above, the at least one triangle is then constructed from the de-quantized positions $p_{dec}$ of the at least three vertices and the decoded determined point $C_{dec}$.

Figure 9:
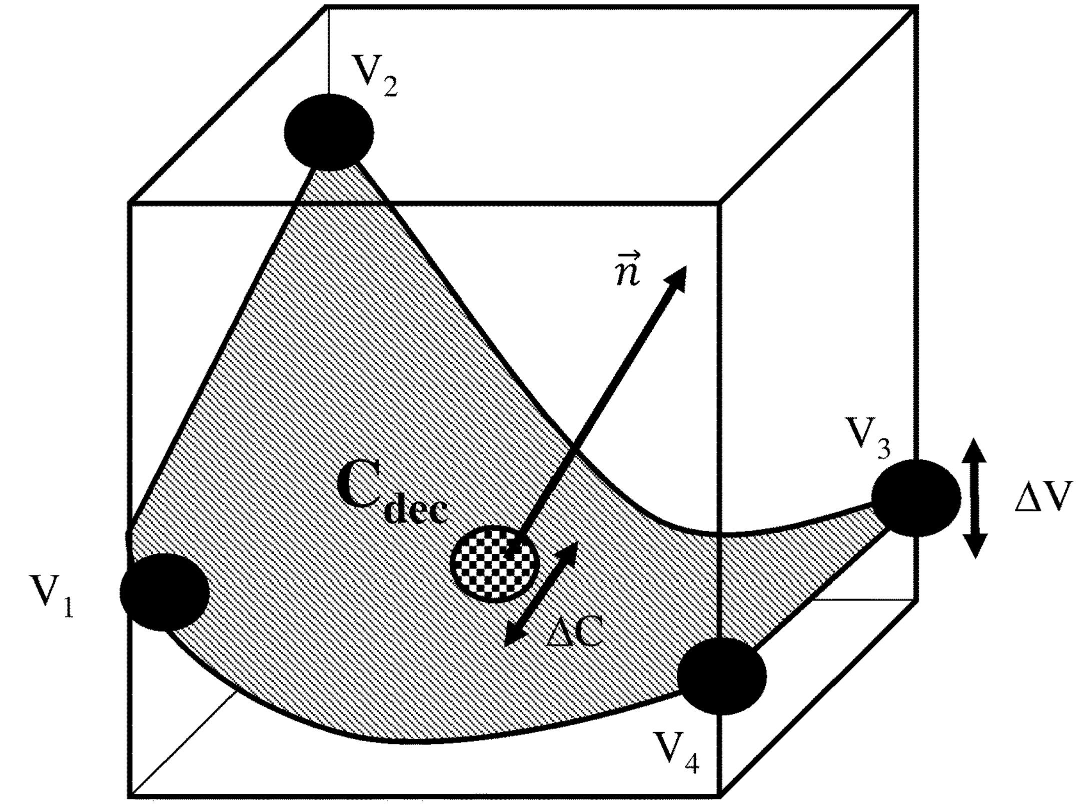
FIG. 9 shows an illustrative example of a quantization step $\Delta V$ for the de-quantized vertex positions and a quantization step $\Delta C$ for a residual value $\alpha$ associated with a decoded determined point of a cuboid volume in accordance with one embodiment.

FIG. 9 shows an illustrative example of a quantization step $\Delta V$ for the de-quantized vertex positions and a quantization step $\Delta C$ for a residual value $\alpha$ associated with the decoded determined point $C_{dec}$ of a cuboid volume.

Figure 10:
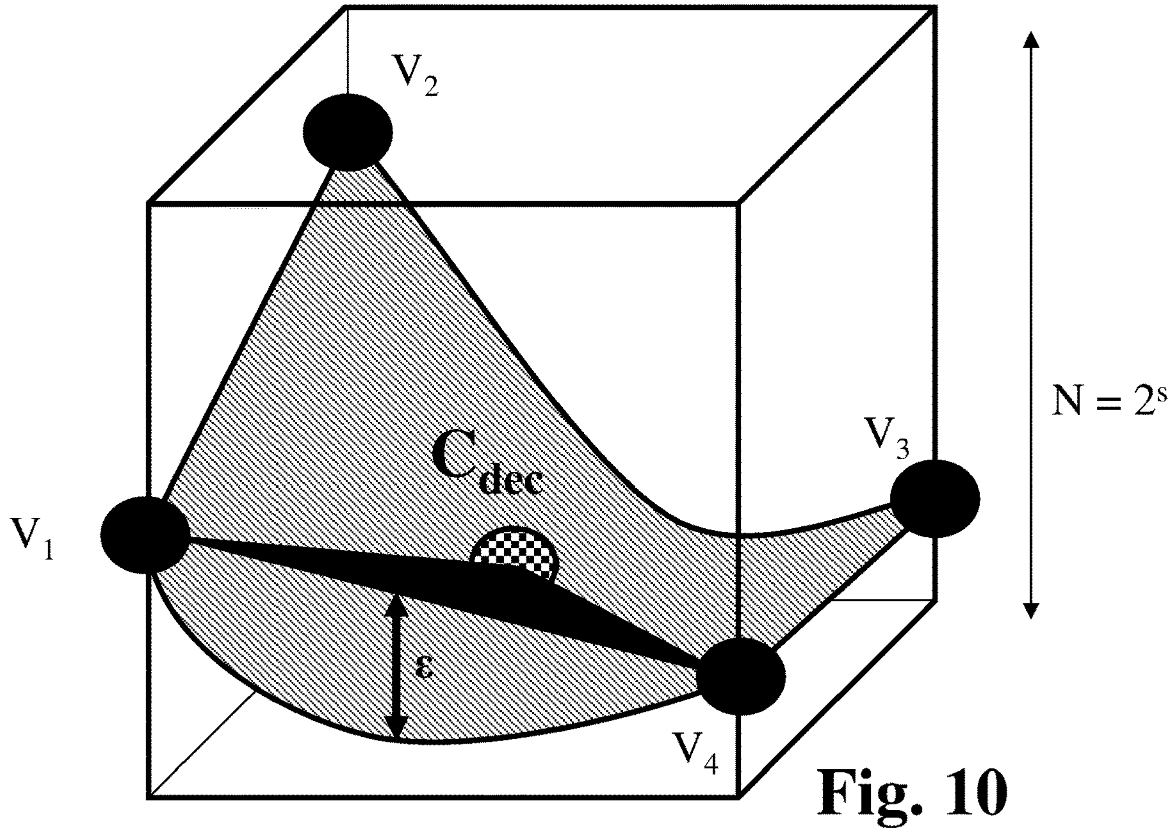
FIG. 10 shows an example of a surface defined locally by points of the point cloud encompassed by the cuboid volume in accordance with one embodiment.

One of the problems to solve is to provide tools that allow for the adequate choice of vertex and residual quantization steps $\Delta V$ and $\Delta C$ to optimize the bitrate vs. distortion trade-off and/or obtain a bitrate compatible with a transmission channel.

vertices $V_i$ (having de-quantized positions $p_{dec}$) and the decoded determined point $C_{dec}$ are approximatively located on a surface (hashed surface on FIG. 10) that is defined locally by the points of the point cloud encompassed by the cuboid volume. The surface is approximated by triangles constructed from the vertices $V_i$ and the decoded determined point $C_{dec}$. This is a first order approximation of the surface that leads to a local error E proportional to the distance between points of interpolation; this distance is itself proportional to the node size N. Thus, one gets $$\varepsilon \approx \beta N \ (\beta < 1).$$

Uniform precision of the first approximation of the surface is obtained by setting vertex and residual quantization steps equal $\Delta V \approx \Delta C$.

Having vertex and/or residual quantization steps smaller than the error $\varepsilon$ is a waste of bitrate for no significant improvement on the surface approximation. On the other hand, instead of having vertex and/or residual quantization steps bigger than the error ε, one should use a bigger node size to further diminish the bitrate.

Therefore, a logical trade-off is $\varepsilon \approx \Delta V \approx \Delta C$.

By doing so, the number b of bits needed for coding a vertex position is $$b = \log_2(N/\Delta V) \approx \log_2(N/\varepsilon) \approx \log_2(1/\beta)$$

and this number b does not depend on the node size N but it depends instead on the local priors (parameter β) of the point cloud.

In one embodiment, the vertex quantization step ΔV is defined from a quantization parameter named a vertex quantization parameter $QP_V$.

In a variant, the vertex quantization parameter $QP_V$ indicates a number of bits b used for a uniform coding/decoding of a de-quantized vertex positions p:

$$QP_V = b = \log_2(N/\Delta V)$$

The vertex quantization step ΔV is then given by:

$$\Delta V = N * 2^{-QP_v} \quad (1)$$

In a variant, the vertex quantization parameter $QP_V$ is proportional to $2^{-QPv/6}$. The vertex quantization step ΔV is then given by:

$$\Delta V = N * 2^{-QP_v/6} \quad (2)$$

In a variant, the vertex quantization parameter $QP_V$ is the sum of a first vertex quantization parameter $QP_{v,base}$ and a second vertex quantization parameter $QP_{v,offset}$:

$$QP_v = QP_{v,base} + QP_{v,offset}.$$

The first vertex quantization parameter $QP_{v,base}$ and the second vertex quantization parameter $QP_{v,offset}$ are quantization parameters.

In a variant, the vertex quantization step ΔV and the residual quantization step ΔC are equal.

Because the cost of coding of the quantized vertex positions pa and quantized residual values $\alpha_Q$ may differ due to difference of efficiency of prediction and entropy coding, the assumption $\Delta V \approx \Delta C$ may not provide the best result to optimize the bitrate vs distortion trad-off.

To improve the coding efficiency and thus improve the bitrate vs distortion trad-off, in one embodiment, the residual quantization step ΔC is defined from a residual quantization parameter $QP_c$.

The residual quantization parameter $QP_c$ is a quantization parameter.

In variant, the residual quantization parameter $QP_c$ equals a sum of the vertex quantization parameter $QP_V$ and a QP offset parameter $QP_{offset}$ representative of a difference of quantization between vertex positions p and residual values α:

$$QP_c = QP_V + QP_{offset}.$$

The QP offset parameter $QP_{offset}$ is a quantization parameter.

The quantization step ΔC is then proportional to the quantization step ΔV and the ratio of the quantization step ΔC over the quantization step ΔV depends on the QP offset parameter $QP_{offset}$.

For example, one may have $\Delta C = \Delta V * 2^{-QPoffset} = N * 2^{-(QPv+QPoffset)}$ (3)

For example, one may have $\Delta C = \Delta V * 2^{-QPoffset/6} = N * 2^{-(QPv+QPoffset)/6}$ (4)

In a variant, the QP offset parameter $QP_{offset}$ is the sum of a first QP offset parameter $QP_{offset,base}$ and a second QP offset parameter $QP_{offset,offset}$:

$$QP_{offset} = QP_{offset,base} + QP_{offset,offset}$$

The first OP offset parameter $QP_{offset,base}$ and the second QP offset parameter $QP_{offset,offset}$ are quantization parameters.

In one embodiment, the vertex quantization parameter $QP_V$, and/or the QP offset parameter $QP_{offset}$, may depend on the size N of cuboid volumes (nodes).

This improves relationship between the vertex quantization parameter $QP_V$ and the bitrate vs distortion trade-off because the bitrate vs. distortion optimization depends on N.

In one embodiment, a list of vertex quantization parameters $QP_V(N)$ is signalled in the bitstream B, each element of the list corresponding to a particular vertex quantization parameters $QP_V(N)$ for a particular size N.

The vertex quantization parameters $QP_V(N)$ are quantization parameters.

For example, N may be equal to 4, 8, 16 and 32 leading to a list of four vertex quantization parameters $QP_V(N)$.

Each vertex quantization parameter $QP_V(N)$ may be a vertex quantization parameter $QP_V$ obtained as discussed above.

In a variant, the vertex quantization parameter $QP_V(N)$ is the sum of a first vertex quantization parameter $QP_{v,base}(N)$ and a second vertex quantization parameter $QP_{v,offset}(N)$: $QP_v(N) = QP_{v,base}(N) + QP_{v,offset}(N)$.

The first vertex quantization parameter $QP_{v,base}(N)$ and the second vertex quantization parameter $QP_{v,offset}(N)$ are quantization parameters.

In one embodiment, a vertex quantization parameter $QP_V(N)$ may equal to a residual value quantization parameter $QP_c(N)$ and/or a residual value quantization parameter $QP_c(N)$ may be inferred from a vertex quantization parameter $QP_V(N)$ and a QP offset parameter $QP_{offset}$.

In one variant, a vertex quantization parameter $QP_V(N1)$ of the list of vertex quantization parameter $QP_V(N)$ may be differentially encoded from another vertex quantization parameter $QP_V(N2)$ of the list of vertex quantization parameter $QP_V(N)$.

For instance, the vertex quantization parameter QPv(4) of the list of vertex quantization parameters may be first signalled, then a difference between another vertex quantization parameter QPv(8) of the list of vertex quantization parameters and the vertex quantization parameter QPv(4), i.e. QPv(8)-QPv(4), may be encoded instead of the vertex quantization parameter QPv(8), to save some bits.

The at least one quantization parameter used for quantizing/de-quantizing positions of vertices located on edges of cuboid volumes and the residual values α of those cuboid volumes may be locally adapted for better bitrate vs distortion trade-off.

In order to perform such an adaptation, the at least one quantization parameter may be provided and signalled (encoded/decoded) on-the-fly during the encoding/decoding of the tree representing the point cloud geometry.

Signalling the at least one quantization parameter means encoding the at least one quantization parameter into the bitstream B (steps 130) and decoding the at least one quantization parameter from the bitstream B (steps 220).

In one embodiment, the at least one quantization parameter may be signalled for each TriSoup encoded cuboid volume (i.e. for positions of points of the point cloud encompassed in those cuboid volumes that are encoded on the principle of the TriSoup coding scheme) of the tree representing the point cloud geometry.

The at least one quantization parameter may then apply to a single TriSoup encoded cuboid volume (node) and all vertices (having de-quantized positions) of said TriSoup encoded cuboid volume (node).

In one embodiment, the at least one quantization parameter may be signalled for each TriSoup encoded cuboid volume at a specific depth in the tree representing the point cloud geometry, the signalled quantization parameter applying to each TriSoup encoded cuboid volume descending from the node in which they are signalled.

The at least one quantization parameter may then apply to all TriSoup encoded cuboid volumes (nodes) at the specific depth in the tree and all vertices (having de-quantized positions) of said all TriSoup encoded cuboid volumes (nodes) of the tree representing the point cloud geometry.

In one embodiment, the at least one quantization parameter may be signalled in a geometry parameter set usually used in G-PCC for signalling geometry parameters used for encoding a point cloud.

The at least one quantization parameter may then apply to all TriSoup encoded cuboid volumes (nodes) and all vertices (having de-quantized positions) of said all TriSoup encoded cuboid volumes (nodes) of the tree representing the point cloud geometry.

In one embodiment, the at least one quantization parameter may be signalled in a slice, tile or sub-picture header.

The at least one quantization parameter may then apply to all TriSoup encoded cuboid volumes (nodes) relative to a slice, tile or sub-picture and all vertices (having de-quantized positions) of said all TriSoup encoded cuboid volumes (nodes).

As defined in VVC (ISO/IEC 23090-3 Versatile Video Coding, ITU-T Recommendation H.266, https://www.itu-.int/rec/T-REC-H.266-202008-I/en), a tile is a sequence of coding-tree units (CTUs) that covers a rectangular picture area of a video picture. A slice comprises an integer number of tiles or an integer number of consecutive complete CTU rows within a tile. A sub-picture contains one or more slices that collectively cover a rectangular picture area.

When at least one first quantization parameter is signalled in the geometry parameter set and at least one second quantization parameter is signalled in a slice, tile or sub-picture header, the at least one first quantization parameter may then apply to all TriSoup encoded cuboid volumes (nodes) and all TriSoup vertices of said all TriSoup encoded cuboid volumes (nodes) of the tree, and the at least one second quantization parameter may then apply to all TriSoup encoded cuboid volumes (nodes) and all TriSoup vertices of said all TriSoup encoded cuboid volumes (nodes) of the slice, tile or sub-picture header.

In one embodiment, signalling the at least one quantization parameter may comprise signalling the vertex quantization parameter $QP_V$.

In a variant, signalling the at least one quantization parameter may comprise signalling the first vertex quantization parameter $QP_{v,base}$ and the second vertex quantization parameter $QP_{v,offset}$ in two distinct syntax elements.

For example, the first vertex quantization parameter $QP_{v,base}$ is signalled in the geometry parameter set, and the second vertex quantization parameter $QP_{v,offset}$ is signalled in a slice, tile, or sub-picture header.

In one embodiment, signalling the at least one quantization parameter may comprise signalling the residual quantization parameter $QP_c$.

In one embodiment, signalling the at least one quantization parameter may comprise signalling the QP offset parameter $QP_{offset}$.

In one embodiment, signalling the at least one quantization parameter may comprise signalling the first QP offset parameter $QP_{offset,base}$ and the second QP offset parameter $QP_{offset,offset}$ in two distinct syntax elements.

For example, the first QP offset parameter $QP_{offset,base}$ is signalled in the geometry parameter set, and the second QP offset parameter $QP_{offset,offset}$ is signalled in a slice, tile or sub-picture header.

In one embodiment, signalling the at least one quantization parameter may comprise signalling the list of vertex quantization parameter $QP_V(N)$ in a syntax element representative of a geometry parameter set.

In one embodiment, signalling the at least one quantization parameter may comprise signalling the list of vertex quantization parameter $QP_V(N)$ is signalled in a syntax element representative of a slice, tile or sub-picture header.

In one embodiment, signalling the at least one quantization parameter may comprise signalling the first vertex quantization parameter $QP_{v,base}(N)$ and the second vertex quantization parameter $QP_{v,offset}(N)$ are signalled in two distinct syntax elements.

For example, the first vertex quantization parameter $QP_{v,base}(N)$ is signalled in a geometry parameter set, and the second vertex quantization parameter $QP_{v,offset}(N)$ is signalled in a slice, tile or sub-picture header.

In one variant, signalling the at least one quantization parameter may comprise signalling a difference between a first vertex quantization parameter $QP_V(N1)$ of the list of the list of vertex quantization parameter $QP_V(N)$ and another vertex quantization parameter $QP_V(N2)$ of the list of vertex quantization parameter $QP_V(N)$.

Figure 11:
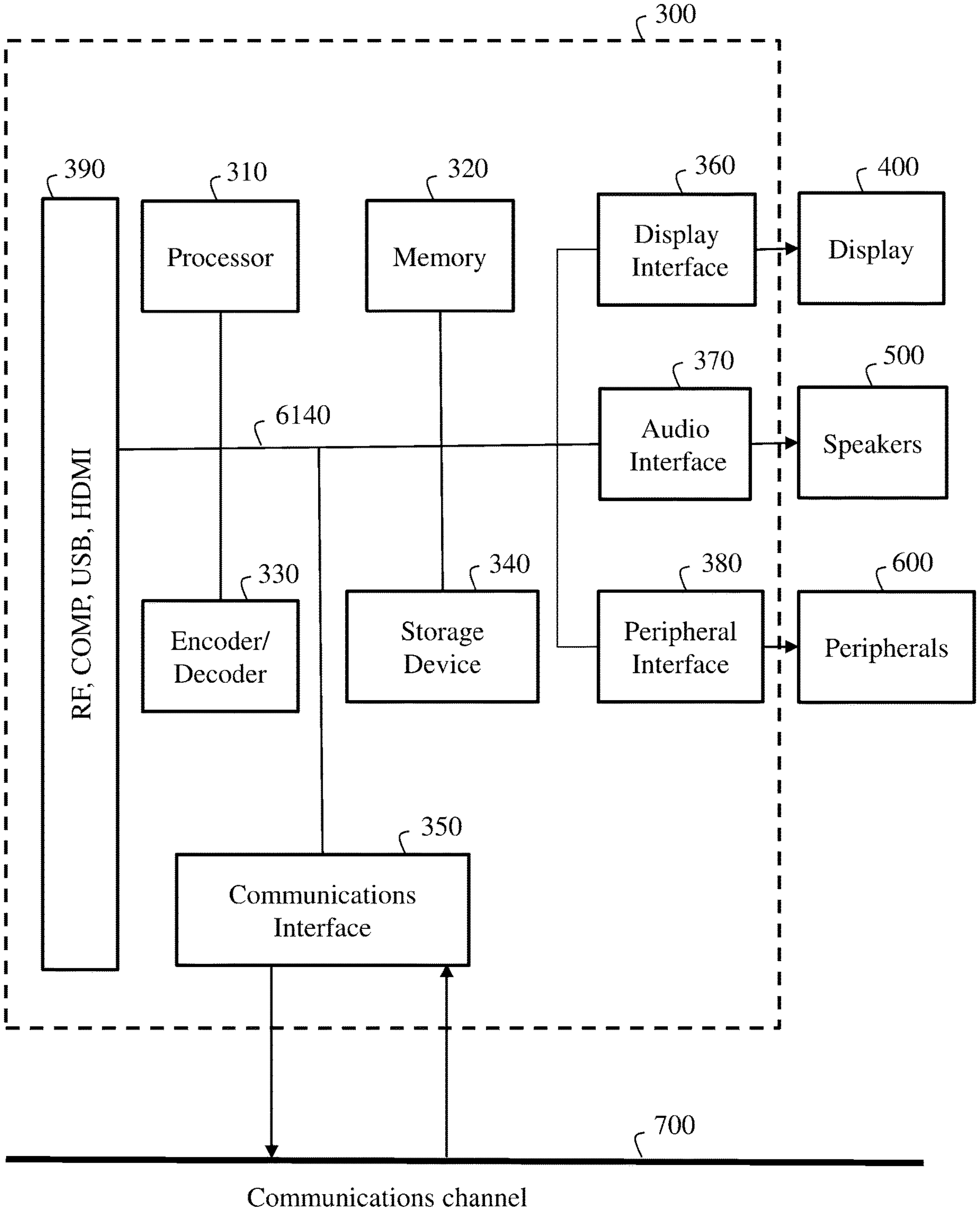
FIG. 11 illustrates a schematic block diagram of an example of a system in which various aspects and embodiments are implemented.

FIG. 11 shows a schematic block diagram illustrating an example of a system in which various aspects and embodiments are implemented.

System 300 may be embedded as one or more devices including the various components described below. In various embodiments, the system 300 may be configured to implement one or more of the aspects described in the present disclosure.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present disclosure. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the present disclosure may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), WC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input 390 is part of a separate set-top box. In various embodiments in which the display 400 and speakers 500 may be external components, the output signal may be provided via dedicated output connections, including, for example, HDMI ports, USB ports, or COMP outputs.

In FIGS. 1-11, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Embodiments of the present disclosure further provides an electronic device, which includes: a processor; and a memory for storing instructions executable by the processor. The processor is configured to perform any of the methods as describe above.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of present disclosure. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout present disclosure are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure, is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in present disclosure, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in present disclosure, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in present disclosure may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in present disclosure.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, present disclosure may refer to "obtaining" various pieces of information. Obtaining the information may include one or more of, for example, estimating the information, calculating the information, predicting the information, or retrieving the information from memory.

Further, present disclosure may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, present disclosure may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by present disclosure.

The invention claimed is:

1. A method of encoding, into a bitstream, positions of points of a point cloud encompassed in a cuboid volume, the positions being represented in a three-dimensional coordinate system, at least three vertices being located on edges of the cuboid volume, wherein the method comprises:

obtaining quantized positions of the at least three vertices by quantizing the positions of the at least three vertices based on a vertex quantization step that depends on at least one quantization parameter;

encoding, into the bitstream, vertex information defining the quantized positions of the at least three vertices;

encoding the at least one quantization parameter into the bitstream;

wherein the method further comprises:

obtaining de-quantized positions of the at least three vertices by de-quantizing positions of the at least three vertices based on the vertex quantization step;

determining a point in the cuboid volume by adding a centroid point defined from a mean value of the de-quantized positions of the at least three vertices and a one-dimensional residual position defined as a product of a normal vector by a residual value;

obtaining a quantized residual value by quantizing the residual value based on a residual quantization step that depends on the at least one quantization parameter; and encoding the quantized residual value into the bitstream;

wherein the vertex quantization step is defined from a vertex quantization parameter, a residual quantization step is defined from a residual quantization parameter and the residual quantization parameter equals a sum of the vertex quantization parameter and at least one other quantization parameter named QP offset parameter.

2. The method of claim 1, wherein at least one of the vertex quantization parameter or the QP offset parameter depends on a size of the cuboid volume.

3. The method of claim 2, wherein the size of the cuboid volume belongs to a list of vertex quantization parameters, each element of the list corresponding to a particular vertex quantization parameters for a particular size, and wherein the list of vertex quantization parameters is encoded into the bitstream.

4. The method of claim 2, wherein a quantization parameter is a sum of a first quantization parameter and a second quantization parameter.

5. The method of claim 4, wherein the first quantization parameter and the second quantization parameter belong to two distinct syntax elements encoded into the bitstream.

6. The method of claim 1, wherein the at least one quantization parameter of a geometry parameter set encoded into the bitstream.

7. The method of claim 1, wherein the at least one quantization parameter of a slice header, a tile header or a sub-picture header encoded into the bitstream.

8. A method of decoding, from a bitstream, positions of points of a point cloud encompassed in a cuboid volume, the positions being represented in a three-dimensional coordinate system, wherein the method comprises:

decoding, from the bitstream, vertex information defining at least three vertices located on edges of the cuboid volume, a single vertex per edge;

decoding at least one quantization parameter from the bitstream;

obtaining de-quantized positions of at least three vertices by de-quantizing positions of the at least three vertices based on a vertex quantization step that depends on the at least one quantization parameter;

constructing at least one triangle from the de-quantized positions of the at least three vertices; positions of rendered points obtained by voxelization of the at least one triangle representing the positions of the points of the point cloud encompassed in the cuboid volume;

wherein the method further comprises:

decoding a quantized residual value from the bitstream;

obtaining a de-quantized residual value by de-quantizing the quantized residual value based on a residual quantization step that depends on the at least one quantization parameter;

determining a decoded determined point in the cuboid volume by adding a centroid point defined from a mean value of the de-quantized positions of at least three vertices and a one-dimensional de-quantized residual position defined as a product of a normal vector by the de-quantized residual value; and constructing the at least one triangle from the de-quantized positions of the at least three vertices and the decoded determined point.

9. The method of claim 8, wherein the vertex quantization step is defined from a vertex quantization parameter, the residual quantization step is defined from a residual quantization parameter and the residual quantization parameter equals a sum of the vertex quantization parameter and at least one other quantization parameter named QP offset parameter.

10. The method of claim 8, wherein the at least one quantization parameter of a geometry parameter set decoded from the bitstream.

11. The method of claim 8, wherein the at least one quantization parameter of a slice header, a tile header or a sub-picture header is decoded from the bitstream.

12. A non-transitory storage medium carrying instructions of program code for executing the method of claim 8.

13. A non-transitory storage medium carrying instructions of program code for executing a method of encoding, into a bitstream, positions of points of a point cloud encompassed in a cuboid volume, the positions being represented in a three-dimensional coordinate system, at least three vertices being located on edges of the cuboid volume, wherein the method comprises:

obtaining quantized positions of the at least three vertices by quantizing the positions of the at least three vertices based on a vertex quantization step that depends on at least one quantization parameter;

encoding, into the bitstream, vertex information defining the quantized positions of the at least three vertices;

encoding the at least one quantization parameter into the bitstream;

wherein the method further comprises:

obtaining de-quantized positions of the at least three vertices by de-quantizing positions of the at least three vertices based on the vertex quantization step;

determining a point in the cuboid volume by adding a centroid point defined from a mean value of the de-quantized positions of the at least three vertices and a one-dimensional residual position defined as a product of a normal vector by a residual value;

obtaining a quantized residual value by quantizing the residual value based on a residual quantization step that depends on the at least one quantization parameter; and encoding the quantized residual value into the bitstream;

wherein the vertex quantization step is defined from a vertex quantization parameter, the residual quantization step is defined from a residual quantization parameter and the residual quantization parameter equals a sum of the vertex quantization parameter and at least one other quantization parameter named QP offset parameter.

14. The storage medium of claim 13, wherein at least one of the vertex quantization parameter or the QP offset parameter depends on a size of the cuboid volume.

15. The storage medium of claim 14, wherein the size of the cuboid volume belongs to a list of vertex quantization parameters, each element of the list corresponding to a particular vertex quantization parameters for a particular size, and wherein the list of vertex quantization parameters is encoded into the bitstream the bitstream.

* * * * *